US011526447B1

(12) United States Patent
Wu et al.

(10) Patent No.: US 11,526,447 B1
(45) Date of Patent: Dec. 13, 2022

(54) DESTAGING MULTIPLE CACHE SLOTS IN A SINGLE BACK-END TRACK IN A RAID SUBSYSTEM

(71) Applicant: EMC IP HOLDING COMPANY LLC, Hopkinton, MA (US)

(72) Inventors: Peng Wu, Westborough, MA (US); Rong Yu, West Roxbury, MA (US); Jiahui Wang, Framingham, MA (US); Lixin Pang, Needham, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/363,167

(22) Filed: Jun. 30, 2021

(51) Int. Cl.
*G06F 12/0844* (2016.01)
*G06F 3/06* (2006.01)

(52) U.S. Cl.
CPC ........ *G06F 12/0844* (2013.01); *G06F 3/0604* (2013.01); *G06F 3/0655* (2013.01); *G06F 3/0689* (2013.01); *G06F 2212/60* (2013.01)

(58) Field of Classification Search
None
See application file for complete search history.

(56) References Cited

U.S. PATENT DOCUMENTS

| 11,340,987 | B1* | 5/2022 | Gole | G06F 3/0644 |
| 2015/0242139 | A1* | 8/2015 | Moore | G06F 3/0659 |
| | | | | 711/114 |
| 2019/0065433 | A1* | 2/2019 | Voigt | G06F 15/17331 |
| 2019/0236002 | A1* | 8/2019 | Chawla | G06F 12/0891 |

* cited by examiner

*Primary Examiner* — Stephanie Wu
(74) *Attorney, Agent, or Firm* — Anderson Gorecki LLP

(57) ABSTRACT

A data service layer running on a storage director node generates a request to destage host data from a plurality of cache slots in a single back-end track. The destage request includes pointers to addresses of the cache slots and indicates an order in which the host application data in the cache slots is to be included in the back-end track. A back-end redundant array of independent drives (RAID) subsystem running on a drive adapter is responsive to the request to calculate parity information using the host application data in the cache slots. The back-end RAID subsystem assembles the single back-end track comprising the host application data from the plurality of cache slots of the request, and destages the single back-end track to a non-volatile drive in a single back-end input-output (IO) operation.

17 Claims, 5 Drawing Sheets

US 11,526,447 B1

DESTAGING MULTIPLE CACHE SLOTS IN A SINGLE BACK-END TRACK IN A RAID SUBSYSTEM

TECHNICAL FIELD

The subject matter of this disclosure is generally related to electronic data storage systems, and more particularly to data storage systems that present logical storage volumes and implement redundant arrays of independent disks (RAID).

BACKGROUND

High-capacity data storage systems such as storage area networks (SANs), network-attached storage (NAS), and storage arrays are used to maintain large storage objects and contemporaneously support multiple clients such as host servers. A storage array includes a network of specialized interconnected compute nodes that manage access to data stored on arrays of drives. The compute nodes respond to input-output (IO) commands from host applications running on the host servers. Examples of host applications may include, but are not limited to, software for email, accounting, manufacturing, inventory control, and a wide variety of other business processes.

At least some storage arrays are characterized by a block-based architecture. IOs from hosts reference logical block addresses (LBAs) of data allocation units known as front-end tracks (FE TRKs) of a logical volume of storage that the compute nodes present to the host servers. The compute nodes lack metadata that describes high-level data structures such as files in the host application data but maintain metadata that maps between the FE TRKs and physical addresses of corresponding back-end tracks (BE TRKs) on the managed drives. BE TRKs and FE TRKs should not be confused with the hard disk drive (HDD) tracks that characterize spinning disk storage architecture. An HDD track corresponds to a concentric band on a platter. A sector, which is the smallest unit of storage that an HDD can process, is a portion of one of those concentric bands, e.g., 1 track may have 32 sectors. BE TRKs are usually larger in size than HDD tracks and are not limited by the physical architecture of a spinning platter.

It is common practice to configure a storage array to use a single, fixed-size allocation unit for IOs so that metadata is practical and efficient for the compute nodes to manage. For example, the BE TRK size may be equal to the FE TRK size and equal to the size of compute node memory allocation units known as cache slots. In such a configuration, the data associated with an updated FE TRK, e.g., due to a write IO, is located in one cache slot that is eventually destaged to the managed drives in one BE TRK in a single back-end IO. Although such a configuration facilitates metadata manageability, it may be desirable to implement FE TRKs that differ in size from the BE TRKs or that have variable size.

SUMMARY

All examples, aspects, and features mentioned in this document can be combined in any technically possible way.

In accordance with some implementations an apparatus comprises: a plurality of non-volatile drives on which host application data is stored in back-end allocation units; a storage director node comprising volatile memory with a cache slots partition including a plurality of cache slots, the storage director configured to present to hosts a logical production volume on which the host application is stored in front-end track allocation units; a drive adapter configured to access the drives using back-end track allocation units; a data service layer running on the storage director node, the data service layer configured to generate a request to destage host data from a plurality of the cache slots in a single back-end track; and a back-end redundant array of independent drives (RAID) subsystem running on the drive adapter, the back-end RAID subsystem configured, responsive to the request, to calculate parity using the host data in the cache slots, assemble the single back-end track comprising the host data from the plurality of cache slots of the request, and destage the single back-end track to one of the non-volatile drives in a single back-end input-output (IO) operation.

In accordance with some implementations a method is implemented in a storage system comprising a plurality of non-volatile drives on which host application data is stored in back-end allocation units, a storage director node comprising volatile memory with a cache slots partition including a plurality of cache slots, the storage director configured to present to hosts a logical production volume on which the host application is stored in front-end track allocation units, and a drive adapter configured to access the drives using back-end track allocation units, the method comprising: a data service layer on the storage director node generating a request to destage host data from a plurality of the cache slots in a single back-end track; and responsive to the request, a back-end redundant array of independent drives (RAID) subsystem on the drive adapter: calculating parity using the host data in the cache slots; assembling the single back-end track comprising the host data from the plurality of cache slots of the request; and destaging the single back-end track to one of the non-volatile drives in a single back-end input-output (IO) operation.

In accordance with some implementations a non-transitory computer-readable storage medium stores instructions that when executed by compute nodes of a storage array cause the compute nodes to perform a method for destaging multiple memory locations to a single back-end allocation unit on a non-volatile drive, the method comprising: a data service layer on a storage director node generating a request to destage host data from a plurality of the cache slots in a single back-end track; and responsive to the request, a back-end redundant array of independent drives (RAID) subsystem on a drive adapter: calculating parity using the host data in the cache slots; assembling the single back-end track comprising the host data from the plurality of cache slots of the request; and destaging the single back-end track to one of the non-volatile drives in a single back-end input-output (IO) operation.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
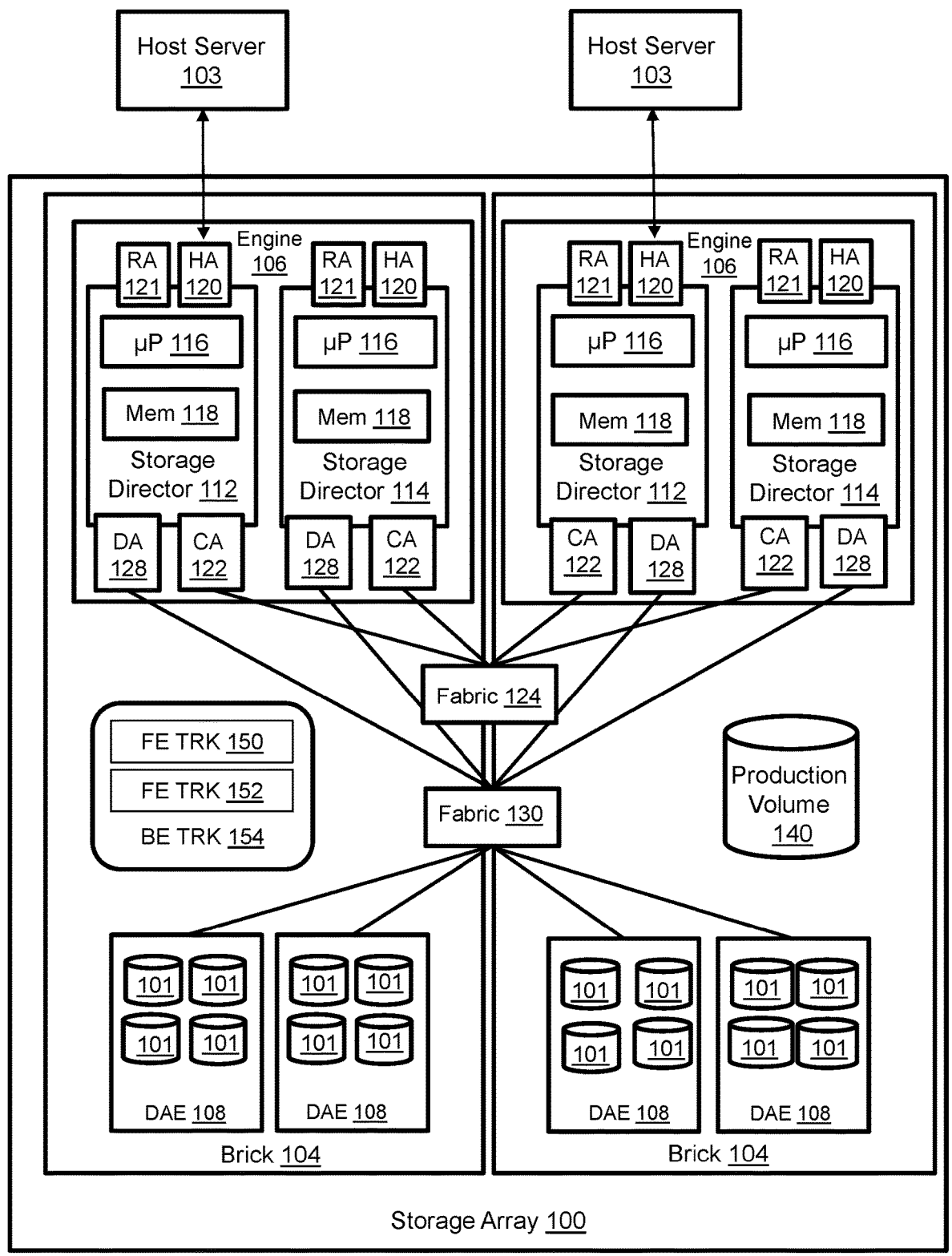
FIG. 1 illustrates a storage array configured to destage multiple cache slots in a single BE TRK in a single back-end IO.

FIG. 1 illustrates a storage array 100 configured to destage multiple cache slots in a single BE TRK in a single back-end IO. The storage array 100 is depicted in a simplified data center environment supporting two host servers 103 that run host applications. However, there would typically be more than two host servers. The host servers 103 may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the storage directors 112, 114. Nevertheless, the host applications could run on the storage directors, e.g., on virtual machines or in containers. Each storage director includes resources such as at least one multi-core processor 116 and local memory 118. The processor may include central processing units (CPUs), graphics processing units (GPUs), or both. The local memory 118, which includes cache slots for host application data, may include volatile media such as dynamic random-access memory (DRAM), non-volatile memory (NVM) such as storage class memory (SCM), or both. One or more host adapters (HAs) 120 are connected to the storage directors to enable communication with the host servers 103. Each host adapter is a compute node with resources for servicing input-output commands (IOs) from the host servers. The HA resources may include processors, volatile memory, and ports via which the host servers may access the storage array. Each storge director is connected to a compute node known as a remote adapter (RA) 121 that enables communication with other storage systems. Each storage director is also connected to one or more compute nodes known as drive adapters (DAs) 128 that enable communication with managed drives 101 in the DAEs 108. Each DA has processors, volatile memory, and ports via which the compute node may access the DAEs for servicing IOs. Each storage director may also be connected to one or more compute nodes known as channel adapters (CAs) 122 that enable communication with other compute nodes via an interconnecting fabric 124. The managed drives 101 are non-volatile electronic data storage media such as, without limitation, solid-state drives (SSDs) based on electrically erasable programmable read-only memory (EEPROM) technology such as NAND and NOR flash memory and hard drive drives (HDDs) with spinning drive magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained on the managed drives 101. The managed drives 101 are not discoverable by the hosts 103 but the storage directors create storage objects that can be discovered and accessed by the hosts. The storage objects that can be discovered by the hosts are sometimes referred to as production volumes 140, 142, and may alternatively be referred to as source devices, production devices, or production LUNs, where the logical unit number (LUN) is a number used to identify logical storage volumes in accordance with the small computer system interface (SCSI) protocol. From the perspective of the hosts 103, each production volume is a single drive having a set of contiguous LBAs at which FE TRKs of data used by the instances of the host application reside. However, the host application data is stored at non-contiguous addresses, possibly on multiple managed drives 101, e.g., at ranges of addresses distributed on multiple drives or multiple ranges of addresses on one drive. The storage directors maintain metadata that maps between the production volumes and the managed drives 101 in order to process IO commands from the hosts using IO commands from the storage directors to the managed drives via the DAs.

The FE TRKs may be larger than, smaller than, or the same size as the BE TRKs. For example, a multi-cache slot FE TRK having the same size as a BE TRK can be destaged without collapse, e.g., a FE TRK sized 128K and having 3 cache slots bind to it, including a first one cache slot covering LBA from block 0 to block 0x3F, a second cache slot covering LBA from block 0x40-0Xc0, and third cache slot covering LBA from 0Xc0-0XFF can be destaged in a single back-end IO. In some implementations the BR TRKs exist in multiple sizes, whereas in other implementations all BE TRKs in the storage array have the same fixed size. For example, and without limitation, a baseline BE TRK size may be the same size as a fixed block architecture (FBA) FE TRK, which may be an integer (greater than 1) multiple of the managed drive sector size. FE TRKs may exist in one or more sizes and may be characterized by variable size. Further, data may be stored in a compressed state. Consequently, in some instances it is possible to accommodate multiple FE TRKs 150, 152 within a single BE TRK 154, thereby utilizing storage resources more efficiently. However, each back-end IO between the DAs and the managed drives accesses only one BE TRK and back-end IOs were previously limited to destaging a single cache slot to a BE TRK, which was problematic for locating multiple FE TRKs in a single BE TRK.

Figure 2:
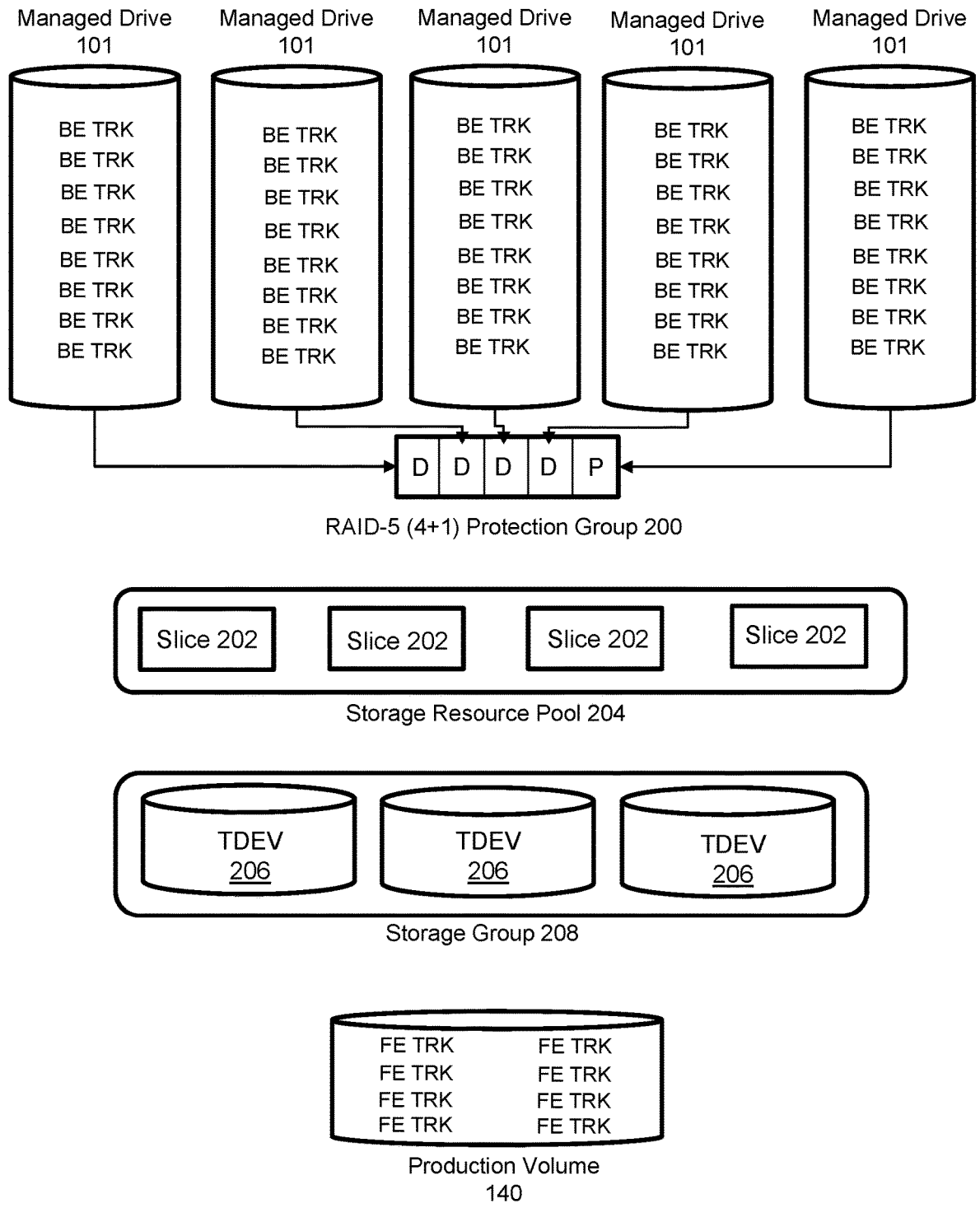
FIG. 2 illustrates layers of abstraction between the managed drives and the production volumes of the storage array of FIG. 1 with a RAID-5 (4+1) implementation.

FIG. 2 illustrates layers of abstraction between the managed drives 101 and production volume 140. In the illustrated example, five BE TRKs from different managed drives are used to create a RAID-5 (4+1) protection group 200, including four data members D and one parity member P. The parity member may be calculated by applying an XOR function to the data members. In order to be RAID-compliant, each member of the protection group must be on a different managed drive. RAID-5 protection group slices 202 are organized into a storage resource pool 204, which is a collection of RAID protection group slices of the same protection type, e.g., RAID-5 (4+1). Logical thin devices (TDEVs) 206 are created from the storage resource pool 204 and organized into a storage group 208. The production volume 140 is created from one or more storage groups.

Figure 3:
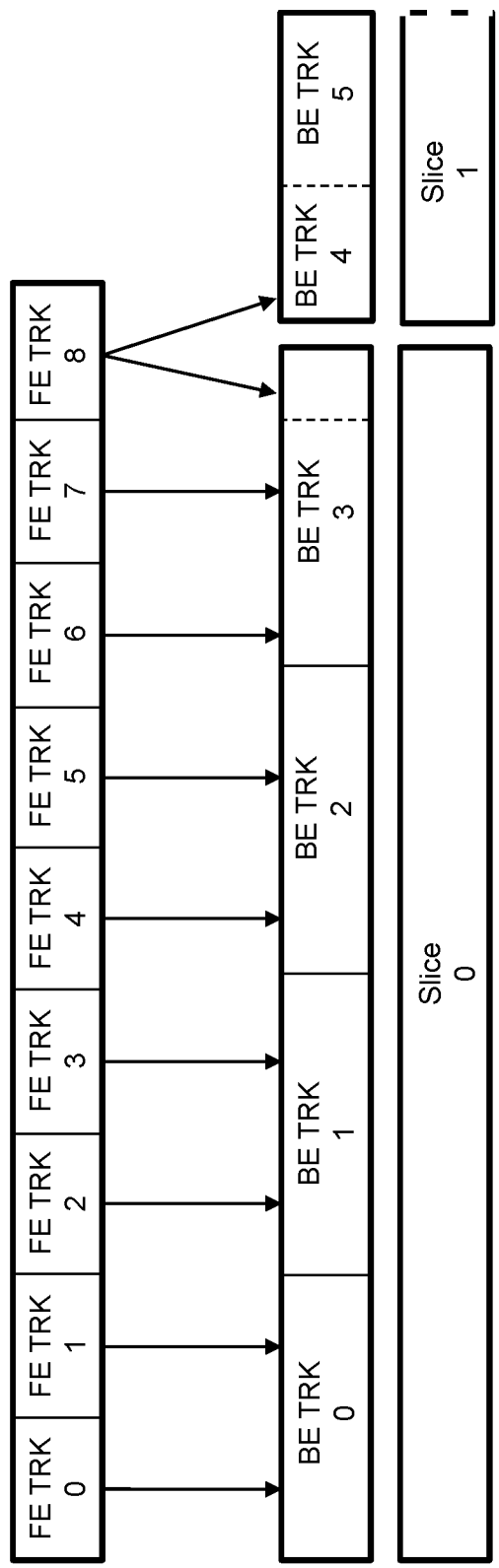
FIG. 3 illustrates packing of variable size FE TRKs in BE TRKs of slices.

FIG. 3 illustrates packing of variable size FE TRKs into BE TRKs. Some FE TRKs may be stored as compressed data, so they are not full-size in the compressed form and require less than a full BE TRK. However, even uncompressed FE TRKs do not necessarily have a single fixed size and may require less than a full BE TRK. On a production volume with a variable-block architecture (VBA) the uncompressed FE TRKs exist in a variety of sizes. For example, a count key data (CKD) track includes data blocks that can vary in length, up to a limit. Variable size FE TRKs can create wasted space when one BE TRK is used to store one smaller FE TRK. Non-full-size FE TRKs such as compressed FE TRKs and variable size FE TRKs can be packed into groups to improve utilization efficiency of storage resources. In the illustrated example, a group of eight full and one partial FE TRKs are packed into BE TRKs. As shown in the illustrated example, packing can result in the data of one FE TRK being distributed among two BE TRKs that are in different slices.

Figure 4:
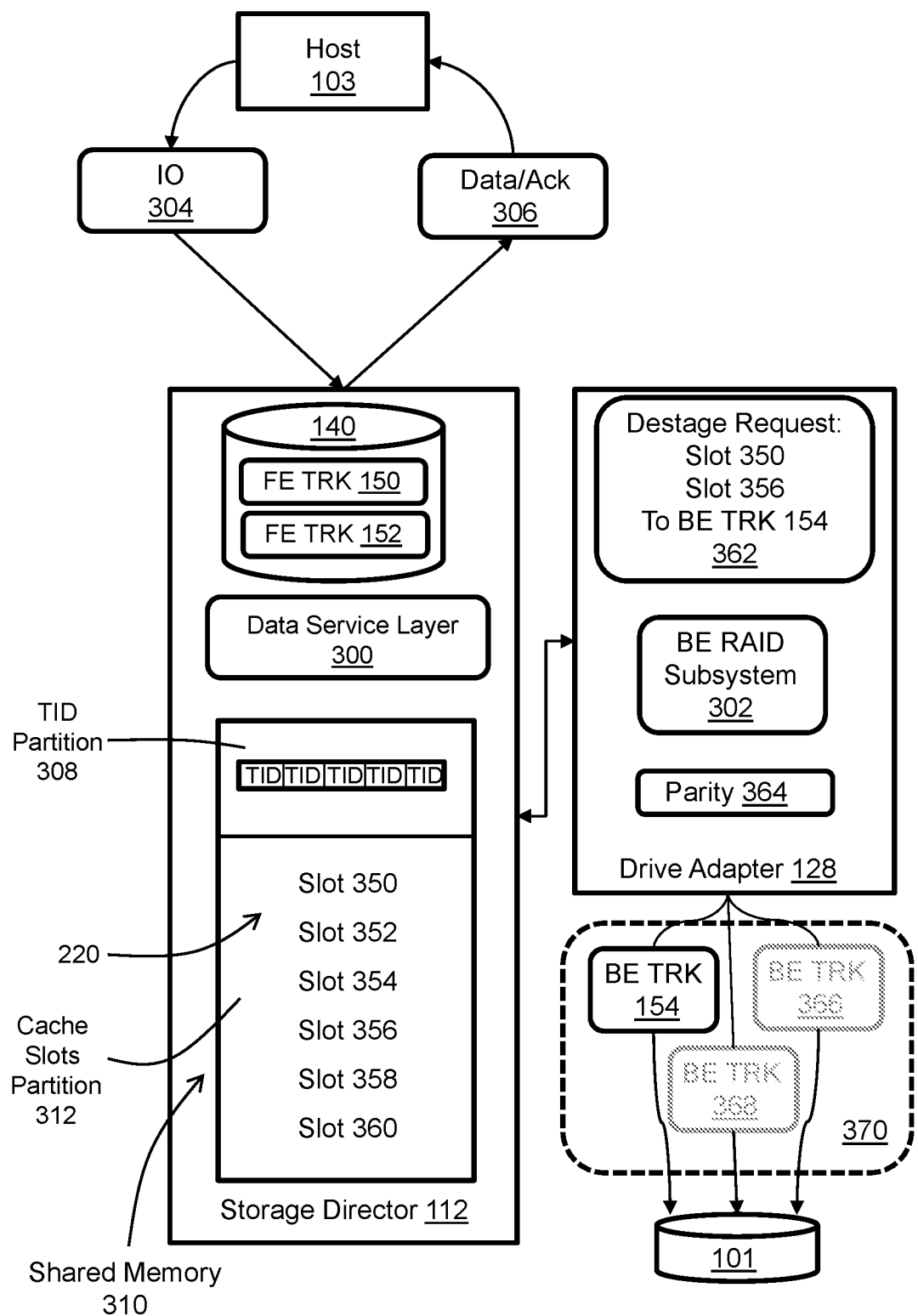
FIG. 4 illustrates operation of the data service layer and BE RAID subsystem.

FIG. 4 illustrates operation of the data service layer 300 and BE RAID subsystem 302. The data service layer 300 runs on the storage director 112. The BE RAID subsystem runs on the drive adapter 128. A front-end IO 304 from host 103 could be a Read command or a Write command. A response 306 to the IO is an Ack in the case of a Write command and data in the case of a Read command. Each storage director in the storage array dedicates a portion of its local memory 118 (FIG. 1) for use as part of a shared memory 310. The shared memory 310 can be accessed by any storage director in the storage array using direct memory access (DMA) or remote direct memory access (RDMA). The shared memory 310 includes a track ID table (TID) partition 308 and a cache slots partition 312. The cache slots partition 312 is used to temporarily stored data for servicing IOs in cache slots 350, 352, 354, 356, 358, 360 (of which there would typically be many). The cache slots may exist in one or more sizes that may or may not be matched to the BR TRK and/or FE TRK sizes. The production volume 140 is organized into FE TRKs, as already explained above, and the TIDs that are maintained in partition 308 include metadata such as pointers to specific cache slots that contain cached host application data. In the case in which IO 302 is a Write that updates FE TRKs 150, 152 that are logically stored on production volume 140 and physically stored on BE TRK 154, the data service layer 300 identifies TIDs corresponding to the FE TRKs 150, 152 by inputting information such as the device number, cylinder number, head (track) and size obtained from the IO 304 into a hash table. The hash table indicates the locations of the TIDs in the TID partition 308. The TID is obtained and used by the data service layer 300 to find the corresponding cache slots 350, 356 that contain the data associated with the FE TRKs 150, 152. The cache slots 350, 356 are not necessarily contiguous in the partition 312. In the case in which the data is not already present in the cache slots partition 312 when the IO 202 is received, the data service layer allocates free cache slots for servicing the IO 304. The allocated free cache slots are not necessarily contiguous. The managed drives 101 have much greater storage capacity than the cache slots, and IOs are serviced continuously, so cache slots are recycled and most of the data maintained by the storage array is not in the cache slots at any point in time. The data of IO 304 is copied into the cache slots 350, 356 by the data service layer and a write pending indicator is set to indicate the presence of dirty data that should be destaged to the managed drives. The ACK 306 may be sent to the host 103 before the dirty data is destaged.

The data service layer 300 prompts destaging of the dirty data from cache slots 350, 364 to BE TRK 154 on the managed drives 101 by generating a destage request 362 that is sent to the drive adapter 128. The BE RAID subsystem 302 running on the drive adapter processes the destage request 362 by identifying the RAID protection group to which the BE TRK 154 belongs, calculating updated parity 364 for that RAID protection group, assembling the BE TRK 154, and writing the BE TRK 154 and updated parity to the managed drives. The BE TRK 154 may be written to the managed drives contemporaneously with other BE TRKs 366, 368 of the slice 370 corresponding to the RAID protection group, but each BE TRK is written in a separate, single back-end IO. The BE RAID subsystem calculates updated parity from the data in the cache slots 350, 352, and assembles the BE TRK 154 by copying the data from the cache slots 350, 356. Consequently, compressed or CKD FE TRK data from multiple cache slots is destaged to a single BE TRK in a single back-end IO.

Figure 5:
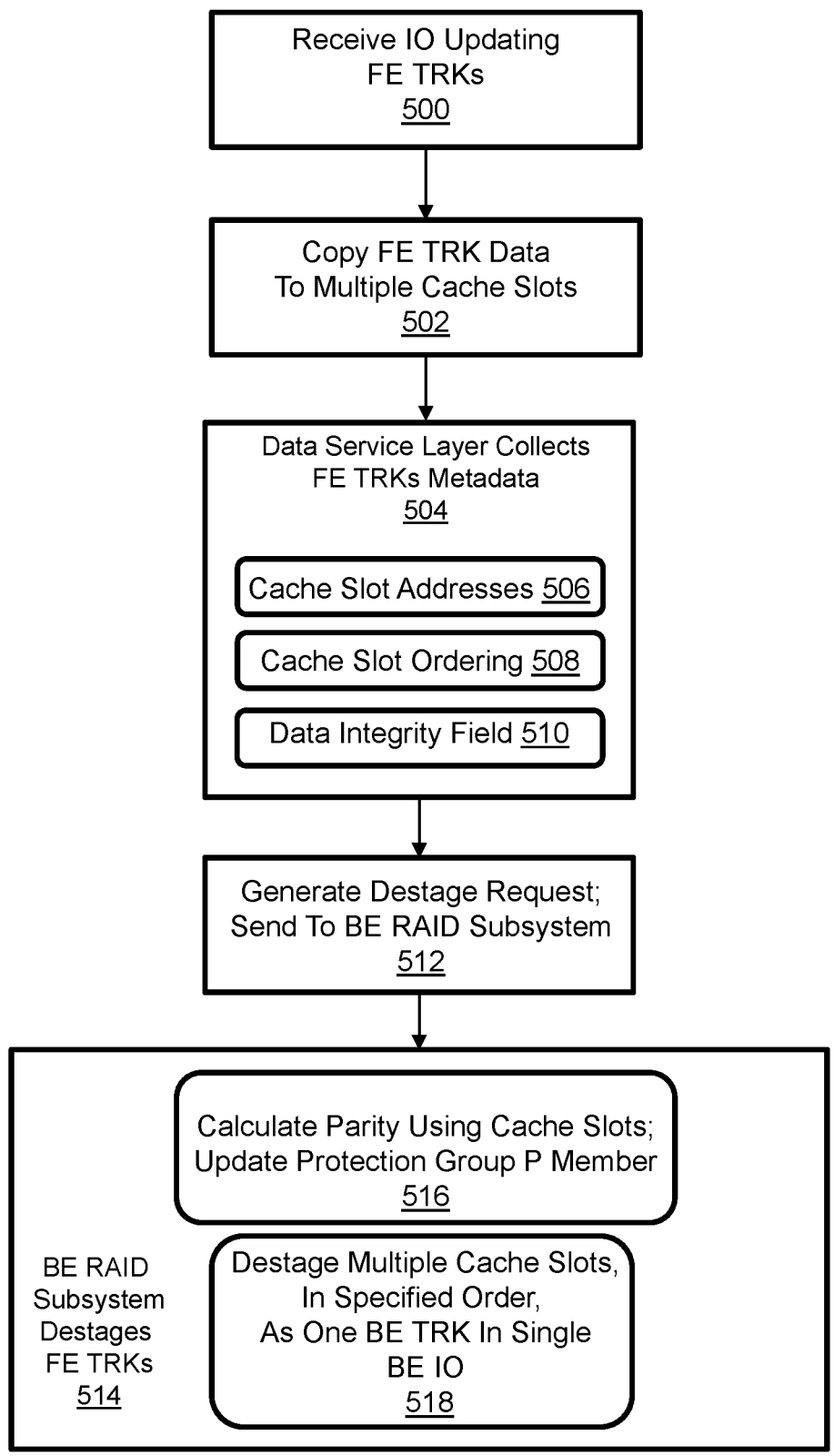
FIG. 5 illustrates a method for destaging multiple cache slots in a single BE TRK in a single back-end IO.

FIG. 5 illustrates a method for destaging multiple cache slots in a single BE TRK in a single back-end IO. Step 500 is receiving one or more front-end IOs that update FE TRKs that differ in size from the BE TRKs. For example, and without limitation, the updated FE TRKs may be compressed tracks or CKD tracks. Step 502 is copying the FE TRK data to multiple cache slots. The cache slots need not be at contiguous locations. In step 504 the data service layer collects metadata associated with the FE TRKs. For example, the collected metadata may include cache slot addresses 506, the order 508 in which the cache slots should be written to the corresponding BE TRK, and data integrity field (DIF) 510 information for each cache slot. In step 512 the data service layer generates a destage request that is sent to the DA. The destage request may indicate the cache slot addresses 506 and cache slot ordering 508 with an ordered set of pointers. In step 514 the BE RAID subsystem destages the FE TRKs in a single BE TRK. Step 514 includes the BE RAID subsystem calculating updated parity from the cache slots and updating the protection group member P of the protection group to which the destaged BE TRK belongs. Step 514 further includes destaging of the data from the multiple cache slots, in the specified order, as one BE TRK in a single back-end IO.

Although no specific advantages should be considered to be part of the invention, implementations of the inventive aspects may improve efficiency by enabling data of multiple FE TRKs to be destaged to a single BE TRK without an intermediate step of collapsing data from multiple cache slots into a single cache slot.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
   a plurality of non-volatile drives on which host application data is stored in back-end track allocation units;
   a storage director node comprising volatile memory with a cache slots partition including a plurality of same-size cache slots, the storage director configured to present to hosts a logical production volume on which the host application data is stored in front-end track allocation units;
   a drive adapter configured to access the drives using back-end track allocation units;
   a data service layer running on the storage director node, the data service layer configured to generate a request to destage at least one of the front-end track allocation units of host application data from a plurality of the cache slots to a single back-end track on one of the drives, wherein the data service layer is configured to include a data integrity field for each cache slot in the request; and
   a back-end redundant array of independent drives (RAID) subsystem running on the drive adapter, the back-end RAID subsystem configured, responsive to the request, to calculate parity using the host application data in the cache slots, assemble the single back-end track comprising the host application data from the plurality of cache slots of the request, and destage the single back-end track to one of the non-volatile drives in a single back-end input-output (IO) operation.

2. The apparatus of claim 1 wherein the data service layer is configured to indicate addresses of the plurality of cache slots in the request.

3. The apparatus of claim 2 wherein the data service layer is configured to indicate an order of the plurality of cache slots in the request.

4. The apparatus of claim 3 wherein the back-end RAID subsystem is configured assemble the single back-end track with the host data in the order specified for the plurality of cache slots.

5. The apparatus of claim 4 wherein the single back-end track is stored on a RAID protection group member of a RAID protection group in a slice of the drives and the back-end subsystem is configured to destage the single back-end track contemporaneous with destaging other back-end tracks of the slice.

6. The apparatus of claim 5 wherein the drive adapter is configured to forward the request to a second drive adapter responsive to the back-end RAID subsystem being unable to service the request.

7. A method implemented in a storage system comprising a plurality of non-volatile drives on which host application data is stored in back-end track allocation units, a storage director node comprising volatile memory with a cache slots partition including a plurality of same-size cache slots, the storage director configured to present to hosts a logical production volume on which the host application data is stored in front-end track allocation units, and a drive adapter configured to access the drives using back-end track allocation units, the method comprising:
   a data service layer on the storage director node generating a request to destage at least one of the front-end track allocation units of host application data from a plurality of the cache slots to a single back-end track on one of the drives and including a data integrity field for each cache slot in the request; and
   responsive to the request, a back-end redundant array of independent drives (RAID) subsystem on the drive adapter:
      calculating parity using the host application data in the cache slots;
      assembling the single back-end track comprising the host application data from the plurality of cache slots of the request; and
      destaging the single back-end track to one of the non-volatile drives in a single back-end input-output (IO) operation.

8. The method of claim 7 comprising the data service layer indicating addresses of the plurality of cache slots in the request.

9. The method of claim 8 comprising the data service layer indicating an order of the plurality of cache slots in the request.

10. The method of claim 9 comprising the back-end RAID subsystem assembling the single back-end track with the host data in the order specified for the plurality of cache slots.

11. The method of claim 10 wherein the single back-end track is stored on a RAID protection group member of a RAID protection group in a slice of the drives and comprising the back-end subsystem destaging the single back-end track contemporaneous with destaging other back-end tracks of the slice.

12. The method of claim 11 comprising the drive adapter forwarding the request to a second drive adapter response to the back-end RAID subsystem being unable to service the request.

13. A non-transitory computer-readable storage medium storing instructions that when executed by compute nodes of a storage array cause the compute nodes to perform a method for destaging multiple memory locations to a single back-end track allocation unit on a non-volatile drive, the method comprising:
   a data service layer on a storage director node generating a request to destage at least one of the front-end track allocation units of host application data from a plurality of the cache slots to a single back-end track on one of the drives and including a data integrity field for each cache slot in the request; and
   responsive to the request, a back-end redundant array of independent drives (RAID) subsystem on a drive adapter:

calculating parity using the host application data in the cache slots;

assembling the single back-end track comprising the host application data from the plurality of cache slots of the request; and destaging the single back-end track to one of the non-volatile drives in a single back-end input-output (IO) operation.

14. The non-transitory computer-readable storage medium of claim 13 wherein the method further comprises the data service layer indicating addresses of the plurality of cache slots in the request.

15. The non-transitory computer-readable storage medium of claim 14 wherein the method further comprises the data service layer indicating an order of the plurality of cache slots in the request.

16. The non-transitory computer-readable storage medium of claim 15 wherein the method further comprises the back-end RAID subsystem assembling the single back-end track with the host data in the order specified for the plurality of cache slots.

17. The non-transitory computer-readable storage medium of claim 16 wherein the single back-end track is stored on a RAID protection group member of a RAID protection group in a slice of the drives and wherein the method further comprises the back-end subsystem destaging the single back-end track contemporaneous with destaging other back-end tracks of the slice.

\* \* \* \* \*